United States Patent
Rukonic et al.

(10) Patent No.: US 8,380,590 B1
(45) Date of Patent: Feb. 19, 2013

(54) METHOD AND SYSTEM FOR DETECTING RECURRING INCOME FROM FINANCIAL TRANSACTION DATA

(75) Inventors: Marko Rukonic, San Jose, CA (US); James Robert Del Favero, Mountain View, CA (US); Nicholas Augustine Mooney, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 775 days.

(21) Appl. No.: 12/414,847

(22) Filed: Mar. 31, 2009

(51) Int. Cl.
*G06Q 40/00* (2012.01)
*G07F 19/00* (2006.01)
*G07B 17/00* (2006.01)

(52) U.S. Cl. .............. 705/30; 705/1.1; 705/35; 705/39; 705/40

(58) Field of Classification Search ............ 705/35, 705/39, 16, 1.1, 30, 27.1, 14.52, 40, 33, 400; 707/1
See application file for complete search history.

(56) References Cited

U.S. PATENT DOCUMENTS

| | | | | |
|---|---|---|---|---|
| 5,842,185 A * | 11/1998 | Chancey et al. | ........... | 705/40 |
| 5,918,216 A * | 6/1999 | Miksovsky et al. | ........... | 705/35 |
| 7,440,961 B1 * | 10/2008 | Matousek | ........... | 1/1 |
| 7,783,515 B1 * | 8/2010 | Kumar et al. | ........... | 705/16 |
| 7,865,411 B2 * | 1/2011 | Stone et al. | ........... | 705/30 |
| 2002/0173986 A1 * | 11/2002 | Lehew et al. | ........... | 705/1 |
| 2004/0044632 A1 * | 3/2004 | Onn et al. | ........... | 705/67 |
| 2005/0283434 A1 * | 12/2005 | Hahn-Carlson et al. | ........ | 705/39 |
| 2005/0289023 A1 * | 12/2005 | Hahn-Carlson et al. | ........ | 705/30 |
| 2006/0195393 A1 * | 8/2006 | Weekley et al. | ........... | 705/39 |
| 2006/0224558 A1 * | 10/2006 | Flora et al. | ........... | 707/1 |
| 2007/0219880 A1 * | 9/2007 | Stone et al. | ........... | 705/30 |
| 2008/0126465 A1 * | 5/2008 | Delaney | ........... | 708/490 |
| 2009/0132347 A1 * | 5/2009 | Anderson et al. | ........... | 705/10 |
| 2010/0100470 A1 * | 4/2010 | Buchanan et al. | ........... | 705/35 |
| 2010/0100476 A1 * | 4/2010 | Ghosh et al. | ........... | 705/39 |
| 2010/0114749 A1 * | 5/2010 | Burras et al. | ........... | 705/35 |
| 2010/0250338 A1 * | 9/2010 | Banerjee et al. | ........... | 705/10 |
| 2010/0280942 A1 * | 11/2010 | Steele et al. | ........... | 705/39 |
| 2011/0010293 A1 * | 1/2011 | Giordano et al. | ........... | 705/39 |

\* cited by examiner

*Primary Examiner* — Russell S Glass
*Assistant Examiner* — Olusegun Goyea
(74) *Attorney, Agent, or Firm* — McKay and Hodgson, LLP; Philip McKay; Sean P. Lewis

(57) ABSTRACT

A method and system for detecting and categorizing recurring income whereby financial transaction data associated with a given user is obtained from one or more sources. One or more income identification parameters are defined. The given user identifies one or more deposit transactions included in the financial transaction data as an income transaction. The one or more income identification parameter values associated with one or more unidentified deposit transactions are then compared with the income identification parameter values associated with the user identified income transactions. Any of one or more unidentified deposit transactions having income identification parameter values the same as, or sufficiently similar to, the income identification parameter values associated with the user identified income transactions are then categorized as identified income transactions of the same type, and/or as being from the same given payor/income source, as the user identified income transactions.

31 Claims, 2 Drawing Sheets

METHOD AND SYSTEM FOR DETECTING RECURRING INCOME FROM FINANCIAL TRANSACTION DATA

BACKGROUND

Currently, various computing system implemented financial management systems are available. Herein, a computing system implemented financial management system can be, but is not limited to, any data management system implemented on a computing system, and/or accessed through a network, that gathers financial data, including financial transactional data, from one or more sources and/or offers the capability to analyze and categorize at least part of the financial data. Herein, a computing system implemented financial management system can be, but is not limited to, any of the following: a computing system implemented personal financial management system; a computing system implemented business financial management system; an on-line banking system; a computing system implemented home and/or business inventory system; a computing system implemented personal and/or business asset management system; a computing system implemented personal and/or business accounting system; a computing system implemented personal and/or business tax preparation system; a computing system implemented healthcare management system; and/or any of the numerous computing system implemented data management systems discussed herein, and/or known to those of skill in the art at the time of filing, and/or as developed after the time of filing, that include the capability to analyze and categorize financial data from multiple sources.

Current computing system implemented financial management systems are typically software and/or Web-based applications which, along with a parent computing system or device, and/or a network, help users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, some computing system implemented financial management systems obtain most, it not all, of the user's financial and/or transactional data as well as a significant amount of the user's demographic and personal data.

Currently, some computing system implemented financial management systems also typically obtain highly detailed financial transaction information from all, or most, sources used, such as payee identification, payee location, payment amount, date of the transaction, time of transaction, products purchased, etc., via communication with banks, credit card providers, or other financial institutions, using data entry, links to databases, and electronic data transfer systems such as the Open Financial Exchange (OFX) specification, or various other systems for transferring financial transaction data.

Using some computing system implemented financial management systems, the financial transaction information, payee identification, payee location, payment amount, date of the transaction, products and/or services purchased via the transaction, various tags and/or labels, and other data is often used by the computing system implemented financial management system to process, categorize and/or tag individual financial transactions as a particular type of income or expense, to generate various financial reports, and to create an overview of the user's financial situation based on input from multiple, and often all, available sources of financial information regarding a given user. Some currently offered computing system implemented financial management systems then use this financial transaction information to track events, such as purchase events, and to provide various historical personal and business data reports or displays including "to date" data reports, such as historical and/or to-date spending data reports, in one or more particular categories and/or tagging schemes, as well as year-end personal and business tax, and/or asset, and/or general financial reports.

While computing system implemented financial management systems have proven to be very powerful and flexible resources, one area where computing system implemented financial management systems have been of limited value is in the area of detecting income sources and, more particularly, identifying incomes sources of a recurring nature.

One reason for this weakness in currently available computing system implemented financial management systems is that while transactional data associated out-going, or debited, financial transactions typically includes very detailed information including payee identification data, payee location data, products purchased, etc., data associated with in-coming, or deposit related, financial transactions typically only includes the deposit amount and date of the transaction, and, therefore, often does not indicate the source of the funds or any other data that could be used to identify a deposit transaction as an specific income, or recurring income, transaction.

As a result, using currently available computing system implemented financial management systems, the user must typically manually identify a given deposit transaction as an income transaction, and/or manually identify the source, or payor, for each income transaction, each time the income transaction appears in the user's financial data, regardless of how often the same income transaction appears. Given that many income transactions are fairly regular and recurring; this puts an undue data entry burden on the user.

To further complicate the situation, many users now have multiple source of income, including, but not limited to: paychecks and/salary; recurring and/or non-recurring bonuses; dividend payments; interest payments; income from on-line auctions; income form various other on-line sources such as advertisers, on-line warehouses, and on-line social networks; structured annuities; structured settlements; alimony; child support; social security; disability payments; other insurance payments; and numerous other sources of income that are currently commonplace. Consequently, relying on a user to accurately identify all of these recurring sources or income is not only a significant burden on the user, but is also prone to mistakes, errors, and/or omissions.

As a result of the situation described above, currently available computing system implemented financial management systems are of typically of limited use for identifying recurring sources of income and/or processing data including recurring sources of income.

SUMMARY

In accordance with one embodiment, a method and system for detecting and categorizing recurring income includes a process for detecting and categorizing recurring income whereby, in one embodiment, financial transaction data associated with a given user is obtained from one or more sources. In one embodiment, one or more income identification parameters are defined. In one embodiment, the one or more income identification parameters include, but are not limited to, an amount range associated with a deposit transaction and a date of deposit range associated with a deposit transaction. In one embodiment, the given user then identifies one or more deposit transactions included in the financial transaction data as an income transaction, and/or indentifies a given payor/ income source associated with one or more identified income transactions. In one embodiment, the user identified income transactions are then analyzed to determine the income identification parameter values associated with the user identified income transactions. In one embodiment, one or more unidentified deposit transactions associated with the user are then analyzed and/or categorized according to the one or more income identification parameter values associated with the each of the one or more unidentified deposit transactions. In one embodiment, the one or more income identification parameter values associated with each the one or more unidentified deposit transactions, and/or unidentified deposit transaction categories, are then compared with the income identification parameter values associated with the user identified income transactions. In one embodiment, any of one or more unidentified deposit transactions having income identification parameter values the same as, or sufficiently similar to, the income identification parameter values associated with the user identified income transactions are then categorized as identified income transactions of the same type, and/or as being from the same given payor/income source, as the user identified income transactions. In one embodiment, the identified income transactions are then analyzed to determine if the identified income transactions are of a recurring nature and, if so, the frequency of the recurring income. In one embodiment, the user is provided the opportunity to review and/or accept the identified income transactions as being correctly categorized.

In one embodiment, the financial transaction data associated with the given user includes, but is not limited to, financial transaction data indicating one or more deposit transactions associated with the user; dates of specific deposit transactions; amounts associated with specific deposit transactions; and/or any other data regarding specific financial transactions desired and/or available.

In one embodiment, access to the financial transaction data associated with the given user is obtained through a computing system implemented financial management system that implements, includes, is accessible by, and/or is otherwise associated with, the process for detecting and categorizing recurring income.

Herein, a computing system implemented financial management system can be, but is not limited to, any data management system implemented on a computing system, and/or accessed through a network, that gathers financial data, including financial transactional data, from one or more sources and/or offers the capability to analyze and categorize at least part of the financial data. Herein, a computing system implemented financial management system can be, but is not limited to, any of the following: a computing system implemented personal financial management system; a computing system implemented business financial management system; an on-line banking system; a computing system implemented home and/or business inventory system; a computing system implemented personal and/or business asset management system; a computing system implemented personal and/or business accounting system; a computing system implemented personal and/or business tax preparation system; a computing system implemented healthcare management system; and/or any of the numerous computing system implemented data management systems discussed herein, and/or known to those of skill in the art at the time of filing, and/or as developed after the time of filing, that include the capability to analyze and categorize financial data from multiple sources.

Specific examples of computing system implemented financial management systems include, but are not limited to: Quicken™, available from Intuit Inc. of Mountain View, Calif.; Quicken On-Line™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other computing system implemented financial management systems discussed herein, and/or known to those of skill in the art at the time of filing, and/or as developed after the time of filing.

Current computing system implemented financial management systems are typically software and/or Web-based applications which, along with a parent computing system or device, and/or a network, help users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain most, it not all, of the user's financial and/or transactional data as well as a significant amount of the user's demographic and personal data.

Currently, some computing system implemented financial management systems also typically obtain highly detailed financial transaction information from all, or most, sources used by the user, such as payee identification, payee location, payment amount, date of the transaction, time of transaction, products purchased, etc., via communication with banks, credit card providers, or other financial institutions, using data entry, links to databases, and electronic data transfer systems such as the Open Financial Exchange (OFX) specification, or various other systems for transferring financial transaction data.

In one embodiment, the financial transaction data associated with the given user is provided to, and/or entered into, and/or transferred to, and/or downloaded to, and/or otherwise obtained by, the process for detecting and categorizing recurring income and/or a computing system implemented financial management system associated with the process for detecting and categorizing recurring income from a user, one or more banks, and/or any other financial institutions, and/or other financial data source via any network or network system, as discussed herein, and/or available or known at the time of filing, and/or as later developed.

In one embodiment, the financial transaction data associated with the given user is provided to, and/or entered into, and/or transferred to, and/or downloaded to, and/or otherwise obtained by, the process for detecting and categorizing recurring income, and/or a computing system implemented financial management system associated with the process for detecting and categorizing recurring income, from a user, one or more banks, and/or any other financial institutions, and/or other financial data source through a user interface device, such as a keyboard, mouse, touchpad, voice recognition software, or any other device and/or system capable of providing input to a computing system and/or for translating various actions into computing system operations, whether available or known at the time of filing or as developed later.

In one embodiment, the financial transaction data associated with the given user is provided to, and/or entered into, and/or transferred to, and/or downloaded to, and/or otherwise obtained by, the process for detecting and categorizing recurring income, and/or a computing system implemented financial management system associated with the process for detecting and categorizing recurring income, from a database maintained by a user, one or more banks and/or any other financial institution or data source, as discussed herein, and/or available or known at the time of filing, and/or as later developed.

In one embodiment, the financial transaction data associated with the given user is provided to, and/or entered into, and/or transferred to, and/or downloaded to, and/or otherwise obtained by, the process for detecting and categorizing recurring income, and/or a computing system implemented financial management system associated with the process for detecting and categorizing recurring income, from a user, one or more banks, and/or any other financial institutions, and/or other financial data source by embedding the data in, or on, a computer program product, as defined herein.

In one embodiment, all, or part, of the financial transaction data associated with the given user is obtained by process the process for detecting and categorizing recurring income, and/or a computing system implemented financial management system, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a user to receive deposits and/or to pay for and/or conduct user financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a user to receive deposits and/or to pay for and/or conduct user financial transactions.

In one embodiment, the financial transaction data associated with the given user is provided to, and/or entered into, and/or transferred to, and/or downloaded to, and/or otherwise obtained by, the process for detecting and categorizing recurring income, and/or a computing system implemented financial management system associated with the process for detecting and categorizing recurring income, from a user, one or more banks, and/or any other financial institutions, and/or other financial data source by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

In one embodiment, all, or part, of the financial transaction data associated with the given user is obtained by the process for detecting and categorizing recurring income from any combination of the above sources and/or from any other source of financial transaction data associated with the given user whether known at the time of filing or as developed thereafter.

In one embodiment, the one or more income identification parameters include, but are not limited to, an exact amount and/or an amount range associated with a deposit transaction such as an exact dollar amount or a dollar amount in a range between a defined low dollar amount and a defined high dollar amount.

In one embodiment, the one or more income identification parameters include, but are not limited to, a date of deposit range associated with a deposit transaction such as a given day, or range of days, of each week, month, quarter, year, etc.

In one embodiment, the one or more income identification parameters are defined by the process for detecting and categorizing recurring income. In one embodiment, the one or more income identification parameters are defined by the process for detecting and categorizing recurring income and can be edited by the user. In one embodiment, the one or more income identification parameters are defined by the user. In one embodiment, the one or more income identification parameters are defined based on an analysis of the financial transaction data associated with the given user. In one embodiment, the one or more income identification parameters are defined by a computing system implemented financial management system that is a parent system for, or is otherwise associated with, the process for detecting and categorizing recurring income.

In one embodiment, the given user identifies one or more deposit transactions included in the financial transaction data as an income transaction, and/or indentifies a given payor/income source associated with one or more identified income transactions through a user interface display displayed on any display device as discussed herein, and/or known in the art at the time of filing, and/or developed after the time of filing, that is accessible by the user. In one embodiment, the display device is associated with any computing system discussed herein, and/or known in the art at the time of filing, and/or as developed after the time of filing.

In one embodiment, the given user identifies one or more deposit transactions included in the financial transaction data as an income transaction, and/or indentifies a given payor/income source associated with one or more identified income transactions using a user interface device, such as a keyboard, mouse, touchpad, voice recognition software, or any other device and/or system capable of providing input to a computing system and/or for translating various actions into computing system operations, whether available or known at the time of filing or as developed later.

In one embodiment, the given user identifies one or more deposit transactions included in the financial transaction data as an income transaction, and/or indentifies a given payor/income source associated with one or more identified income transactions through a computing system implemented financial management system that implements, includes, is accessible by, and/or is otherwise associated with the process for detecting and categorizing recurring income.

As noted above, herein, a computing system implemented financial management system can be, but is not limited to, any data management system implemented on a computing system, and/or accessed through a network, that gathers financial data, including financial transactional data, from one or more sources and/or offers the capability to analyze and categorize at least part of the financial data.

Specific examples of computing system implemented financial management systems include, but are not limited to: Quicken™, available from Intuit Inc. of Mountain View, Calif.; Quicken On-Line™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other computing system implemented financial management systems discussed herein, and/or known to those of skill in the art at the time of filing, and/or as developed after the time of filing.

In one embodiment, the user identified income transactions are then analyzed to determine the income identification parameter values associated with the user identified income transactions and the identified income transactions are categorized according to the income identification parameter values associated with the user identified income transactions.

In one embodiment, the user identified income transactions are analyzed to determine the deposit amount, and/or deposit amount range, associated with the user identified income transactions. In one embodiment, the identified income transactions are analyzed to determine the deposit date, and/or deposit date range, associated with the user identified income transactions.

In one embodiment, one or more unidentified deposit transactions associated with the user, other than the user identified income transactions, are obtained and analyzed, and/or categorized, according to the one or more income identification parameter values associated with each of the one or more unidentified deposit transactions. In one embodiment, one or more of the one or more unidentified deposit transactions associated with the user, other than the user identified income transactions, are historical unidentified deposit transactions pre-dating the user identified income transactions. In one embodiment, one or more of the one or more unidentified deposit transactions associated with the user, other than the user identified income transactions, are future unidentified deposit transactions taking place after the user identified income transactions.

In one embodiment, the one or more income identification parameter values associated with each the one or more unidentified deposit transactions, and/or unidentified deposit transaction categories, are then compared with the income identification parameter values associated with the user identified income transactions to determine if the one or more income identification parameter values associated with each the one or more unidentified deposit transactions, and/or unidentified deposit transaction categories, are the same as, or fall within the range of, the income identification parameter values associated with the user identified income transactions.

In one embodiment, any of one or more unidentified deposit transactions having income identification parameter values the same as, or within the range of, the income identification parameter values associated with the user identified income transactions are then categorized by the process for detecting and categorizing recurring income as identified potential income transactions of the same type, and/or as being from the same given payor/income source, as the user identified income transactions.

In one embodiment, all the identified income transactions, including the user identified income transactions and the process indentified income transactions, are then analyzed to determine if the identified income transactions are of a recurring nature. In one embodiment, the identified income transactions identified as being of a recurring nature are further analyzed to determine a frequency of payment of the identified income and/or to further refine the income identification parameter values, and/or value ranges, associated with the identified income transactions.

In one embodiment, the process indentified income transactions are automatically categorized as being of the same type, and/or as being from the same given payor/income source, as the user identified income transactions. In one embodiment, the process indentified income transactions are automatically temporarily categorized as being of the same type, and/or as being from the same given payor/income source, as the user identified income transactions, and the user is provided the capability of changing the status of the process indentified income transactions. In one embodiment, the process indentified income transactions are provided to the user for user approval before being categorized as being of the same type, and/or as being from the same given payor/income source, as the user identified income transactions.

Using the method and system for detecting and categorizing recurring income, as disclosed herein, the user manually identifies a given deposit transaction as an income transaction, and/or manually identifies the source, or payor, of an income transaction, a minimal number of times; in one embodiment, only once. Then, using the method and system for detecting and categorizing recurring income, as disclosed herein, each time the income transaction appears in the user's financial data as an unidentified deposit transaction, it is automatically, or semi-automatically, identified as an income transaction of the same type, and/or from the same source. Consequently, using the method and system for detecting and categorizing recurring income, as disclosed herein, not only is the user spared the burden of repeatedly identifying the recurring income transaction, and labeling it via manual data input, but a computing system implemented financial management system implementing the method and system for detecting and categorizing recurring income, as disclosed herein, can readily identify the recurring income source and use this information to more efficiently, effectively, and realistically perform financial analysis and provide financial projections.

As discussed in more detail below, using the below embodiments, with little or no modification and/or user input, there is considerable flexibility, adaptability, and opportunity for customization to meet the specific needs of various users under numerous circumstances.

Figure 1:
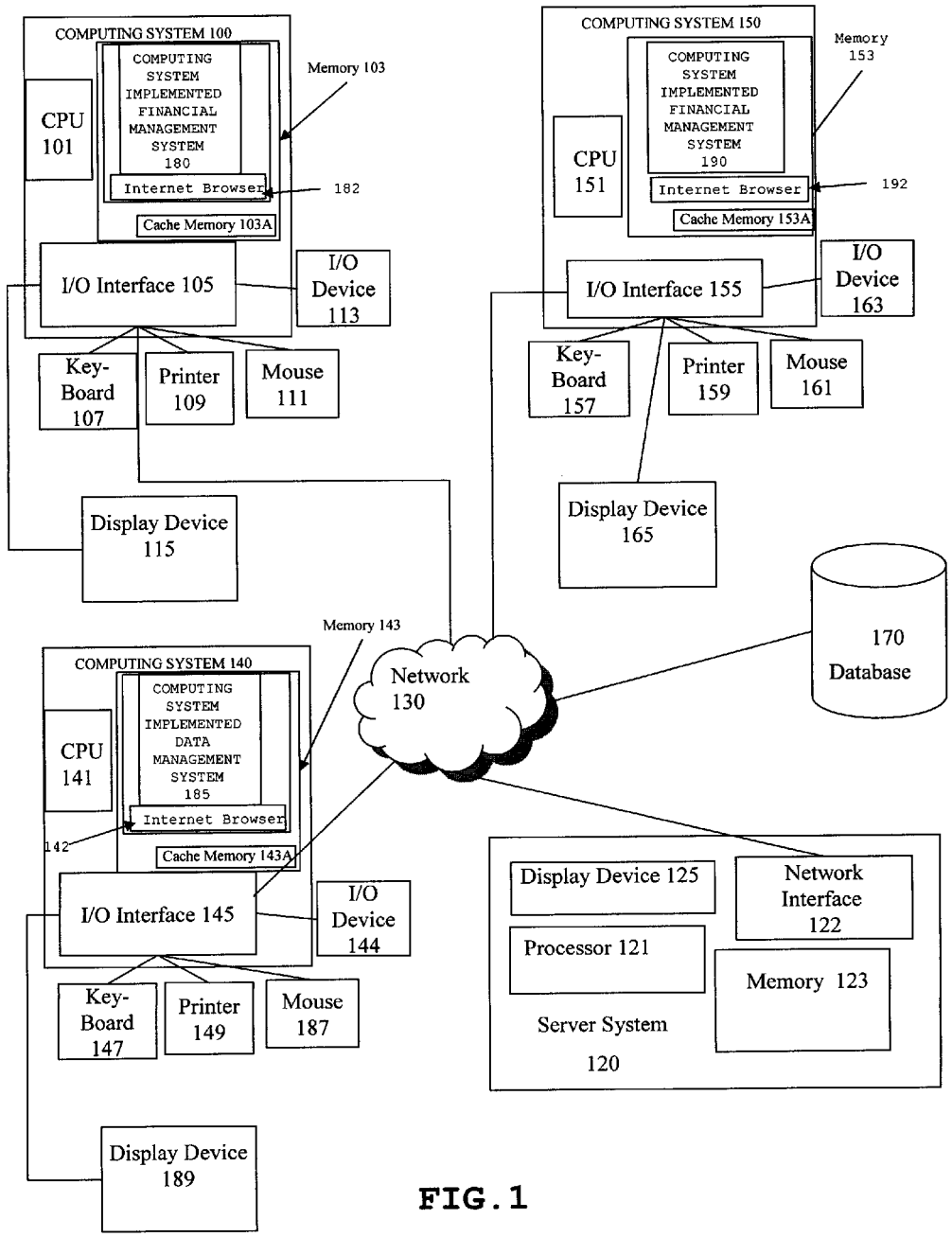
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a method and system for detecting and categorizing recurring income includes a process for detecting and categorizing recurring income whereby, in one embodiment, financial transaction data associated with a given user is obtained from one or more sources. In one embodiment, one or more income identification parameters are defined. In one embodiment, the one or more income identification parameters include, but are not limited to, an amount range associated with a deposit transaction and a date of deposit range associated with a deposit transaction. In one embodiment, the given user then identifies one or more deposit transactions included in the financial transaction data as an income transaction, and/or indentifies a given payor/income source associated with one or more identified income transactions. In one embodiment, the user identified income transactions are then analyzed to determine the income identification parameter values associated with the user identified income transactions. In one embodiment, one or more unidentified deposit transactions associated with the user are then analyzed and/or categorized according to the one or more income identification parameter values associated with the each of the one or more unidentified deposit transactions. In one embodiment, the one or more income identification parameter values associated with each the one or more unidentified deposit transactions, and/or unidentified deposit transaction categories, are then compared with the income identification parameter values associated with the user identified income transactions. In one embodiment, any of one or more unidentified deposit transactions having income identification parameter values the same as, or sufficiently similar to, the income identification parameter values associated with the user identified income transactions are then categorized as identified income transactions of the same type, and/or as being from the same given payor/income source, as the user identified income transactions. In one embodiment, the identified income transactions are then analyzed to determine if the identified income transactions are of a recurring nature and, if so, the frequency of the recurring income. In one embodiment, the user is provided the opportunity to review and/or accept the identified income transactions as being correctly categorized.

FIG. 1 is a block diagram of an exemplary hardware architecture for implementing one embodiment of a system and method for detecting and categorizing recurring income, such as exemplary process 200 (FIG. 2) discussed herein, that, returning to FIG. 1, includes: a computing system 100, e.g., a first computing system; a computing system 150, e.g., a second computing system; a computing system 140, e.g., a third computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented financial management system 180, such as any computing system implemented financial management system defined herein, known in the art at the time of filing, and/or as developed thereafter. In one embodiment, computing system implemented financial management system 180 is stored, in whole, or in part, in memory system 103, and is used by, or includes, or is accessed by, a process for detecting and categorizing recurring income (not shown in FIG. 1, see FIG. 2).

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for detecting and categorizing recurring income, and/or a computing system implemented financial management system, are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, financial data associated with one or more users is stored, in whole, or in part, in memory system 103, and is used by, or is accessed by, a process for detecting and categorizing recurring income, and/or one or more computing system implemented financial management systems, and/or one or more users. In one embodiment, computing system 100 is used, and/or accessible, by another computing system, such as computing systems 150 and/or 140 (discussed below).

Computing system 100 can be any computing system as defined herein and/or as known in the art at the time of filing and/or as developed thereafter, that includes components that can execute all, or part, of a process for detecting and categorizing recurring income, and/or a computing system implemented financial management system, in accordance with at least one of the embodiments as described herein.

As also seen in FIG. 1, computing system 150 typically includes a central processing unit (CPU) 151, an input/output (I/O) interface 155, and a memory system 153, including cache memory 153A. In one embodiment, memory system 153 includes all, or part, of a computing system implemented financial management system 190, such as any computing system implemented financial management system defined herein, known in the art at the time of filing, and/or as developed thereafter. In one embodiment, computing system implemented financial management system 190 is stored, in whole, or in part, in memory system 153, and is used by, or includes, or is accessed by, and/or is otherwise associated with a process for detecting and categorizing recurring income (not shown in FIG. 1, see FIG. 2).

Returning to FIG. 1, computing system 150 may further include standard user interface devices such as a keyboard 157, a mouse 161, a printer 159, and a display device 165, as well as, one or more standard input/output (I/O) devices 163, such as a compact disk (CD) or Digital Video Disc (DVD) drive, floppy disk drive, or other digital or waveform port, or other device capable of inputting data to, and outputting data from, computing system 150, whether available or known at the time of filing or as later developed. As discussed in more detail below, in one embodiment, a process for detecting and categorizing recurring income, and/or a computing system implemented financial management system, are entered, in whole, or in part, into computing system 150 via I/O device 163, such as from a CD, DVD, floppy disk, portable hard drive, memory stick, download site, or other medium and/or computer program product as defined herein.

In one embodiment, computing system 150 also includes an Internet browser capability 192 that, in one embodiment, includes a search engine (not shown) and is stored, in whole, or in part in memory 153.

In one embodiment, data associated one or more users is stored, in whole, or in part, in memory system 153, and is used by, or is accessed by, a process for detecting and categorizing recurring income and/or one or more computing system implemented financial management systems, and/or one or more users. In one embodiment, computing system 150 is used, and/or accessible, by another computing system, such as computing systems 100 and/or 140 (discussed below).

Computing system 150 can be any computing system as defined herein and/or as known in the art at the time of filing and/or as developed thereafter, that includes components that can execute all, or part, of a process for detecting and categorizing recurring income, and/or a computing system implemented financial management system, in accordance with at least one of the embodiments as described herein.

As also seen in FIG. 1, computing system 140 typically includes a central processing unit (CPU) 141, an input/output (I/O) interface 145, and a memory system 143, including cache memory 143A. In one embodiment, memory system 143 includes all, or part, of a computing system implemented data management system 185, such as any computing system implemented data management system defined herein, known in the art at the time of filing, and/or as developed thereafter. In one embodiment, computing system implemented data management system 185 is stored, in whole, or in part, in memory system 143, and is used by, or includes, or is accessed by, a process for detecting and categorizing recurring income (not shown in FIG. 1, see FIG. 2).

Returning to FIG. 1, computing system 140 may further include standard user interface devices such as a keyboard 147, a mouse 187, a printer 149, and a display device 189, as well as, one or more standard input/output (I/O) devices 144, such as a compact disk (CD) or Digital Video Disc (DVD) drive, floppy disk drive, or other digital or waveform port, or other device capable of inputting data to, and outputting data from, computing system 140, whether available or known at the time of filing or as later developed. As discussed in more detail below, in one embodiment, a process for detecting and categorizing recurring income, and/or a computing system implemented data management system, are entered, in whole, or in part, into computing system 140 via I/O device 144, such as from a CD, DVD, floppy disk, portable hard drive, memory stick, download site, or other medium and/or computer program product as defined herein.

In one embodiment, computing system 140 also includes an Internet browser capability 142 that, in one embodiment, includes a search engine (not shown) and is stored, in whole, or in part in memory 143.

In one embodiment, data associated with a process for detecting and categorizing recurring income and/or one or more computing system implemented financial management systems, and/or one or more users, is stored, in whole, or in part, in memory system 143. In one embodiment, computing system 140 is a computing system accessible one or more computing system implemented financial management systems, and/or one or more users. In one embodiment, computing system 140 is used, and/or accessible, by another computing system, such as computing systems 150 and/or 100.

Computing system 140 can be any computing system as defined herein and/or as known in the art at the time of filing and/or as developed thereafter, that includes components that can execute all, or part, of a process for detecting and categorizing recurring income, and/or a computing system implemented data management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100, 140, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of, or otherwise accessible by, a process for detecting and categorizing recurring income, and/or a computing system implemented financial management system, and/or a computing system implemented data management system and/or one or more users.

In one embodiment, data associated with one or more users, and/or a process for detecting and categorizing recurring income, and/or one or more computing system implemented financial management systems, and/or one or more computing system implemented data management systems, is stored, in whole, or in part, in database 170, and is used by, or is accessed by, a process for detecting and categorizing recurring income. In one embodiment, database 170 is accessible by one or more computing system implemented financial management systems, and/or one or more users. In one embodiment, database 170 is used, and/or accessible, by a computing system, such as computing systems 100, 140, and/or 150, and/or a server system, such as sever system 120 (discussed below).

In one embodiment, computing systems 100, 140, and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to peer, arrangement, as an indexing and/or central server used to connect a first computing system, such as computing system 100, and a second computing system, such as computing system 150.

In one embodiment, data associated with one or more users, and/or a process for detecting and categorizing recurring income, and/or one or more computing system implemented financial management systems, and/or one or more computing system implemented data management systems, is stored, in whole, or in part, in server system 120, and is used by, or is accessed by, a process for detecting and categorizing recurring income. In one embodiment, server system 120 is accessible by one or more computing system implemented financial management systems, and/or one or more users. In one embodiment, server system 120 is used, and/or accessible, by a computing system, such as computing systems 100, 140, and/or 150, and/or one or more databases, such as database 170.

Network 130 can be any network or network system as defined herein, and/or known in the art at the time of filing, and/or as developed after the time of filing, capable of allowing communication between two or more computing systems, server systems, and/or databases.

Those of skill in the art will readily recognize that the components shown in FIG. 1, such as computing systems 100, 140, and 150, database 170, server system 120, and their respective components, are shown for illustrative purposes only and that architectures with more or fewer components can implement, and benefit from, one or more embodiments. Moreover, one or more components of computing system 100, computing system 140, computing system 150, database 170, and server system 120 may be located remotely from their respective system and accessed via network 130. In addition, the particular type of, and configuration of, computing systems 100, 140, and 150, database 170, and server system 120 is not relevant.

As discussed in more detail below, in one embodiment, a process for detecting and categorizing recurring income, and/or a computing system implemented financial management system, and/or a computing system implemented data management system, and/or data associated with one or more users, is stored, in whole, or in part, in memory system 103 and/or cache memory 103A, of computing system 100, in memory system 143 and/or cache memory 143A, of computing system 140, and/or memory system 153 and/or cache memory 153A of computing system 150, and/or in server memory system 123 of server system 120 and/or in database 170, and executed on computing system 100, and/or computing system 140, and/or computing system 150. As used herein, a memory refers to a volatile memory, a non-volatile memory, or any combination of the two.

Although a process for detecting and categorizing recurring income, and/or a computing system implemented financial management system, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for detecting and categorizing recurring income, and/or a computing system implemented financial management system, and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 141, and 150, or server system processor 121. In one embodiment, execution of a process by CPU 101, CPU 141, CPU 150, or server system processor 121, results in the operations of an agent computer process (not shown) and/or a rule computer process (not shown).

In one embodiment, a process for detecting and categorizing recurring income, and/or a computing system implemented financial management system, and/or a computing system implemented data management system, and/or data associated with one or more users, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "user" and/or "consumer", include any person, party, business, system, application, organization, and/or entity interacting with, interfacing with, contacting, viewing, providing data to, accepting data from, requesting data from, and/or otherwise associating with the process for detecting and categorizing recurring income for any purpose.

In addition, herein the term "user", includes a person who is the subject of, source of, and/or target of, all, or part of, any data/information obtained and/or analysis performed by a process for detecting and categorizing recurring income, and/or a legal guardian of a person who is the subject of, and/or target of, any data/information obtained and/or analysis performed by a process for detecting and categorizing recurring income, and/or an authorized agent of any party using a process for detecting and categorizing recurring income, and/or a person who is the subject of, and/or target of, any information obtained and/or analysis performed, by a process for detecting and categorizing recurring income, and/or any other authorized party associated with any party using a process for detecting and categorizing recurring income, and/or a person who is the subject of, and/or target of, any information obtained and/or analysis performed by a process for detecting and categorizing recurring income.

Herein the term "financial institution" includes any entity, party, person, application and/or system, such as, but not limited to, banks, credit card companies, asset account companies, and/or investment firms, that engages in money/asset/debt management and/or financial transaction management/recording and/or display.

Herein, a "computing system implemented financial management system" can be, but is not limited to, any data management system implemented on a computing system and/or accessed through a network that gathers financial data, including financial transactional data, from one or more sources and/or offers the capability to analyze and categorize at least part of the financial data. As used herein, the term computing system implemented financial management system includes, but is not limited to: computing system implemented personal and/or business financial management systems, packages, programs, modules, or applications; on-line banking systems; computing system implemented personal and/or business tax preparation systems, packages, programs, modules, or applications; computing system implemented personal and/or business accounting and/or invoicing systems, packages, programs, modules, or applications; and various other personal and/or business electronic data management systems, packages, programs, modules, or applications, whether known at the time of filling or as developed later. Specific examples of computing system implemented financial management systems include, but are not limited to: Quicken™, available from Intuit Inc. of Mountain View, Calif.; Quicken On-Line™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other computing system implemented financial management systems discussed herein, and/or known to those of skill in the art at the time of filing, and/or as developed after the time of filing.

As used herein, the term "computing system", includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers;

PDAs; media players; server computers; or any desired combination of these devices, that are coupled to perform the processes and/or operations as described herein.

As used herein, the term "computing system implemented data management system" includes, but is not limited to: computing system implemented accounting and/or invoicing systems, packages, programs, modules, or applications; online banking systems; computing system implemented financial management systems, packages, programs, modules, or applications; computing system implemented financial management systems, packages, programs, modules, or applications; computing system implemented banking systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented business and/or point of sale systems, packages, programs, modules, or applications; computing system implemented healthcare management systems, packages, programs, modules, or applications and various other electronic data driven data management systems, packages, programs, modules, or applications, whether known at the time of filling or as developed later.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as defined herein, known at the time of filing, or as developed thereafter.

In accordance with one embodiment, a method and system for detecting and categorizing recurring income includes a process for detecting and categorizing recurring income whereby, in one embodiment, financial transaction data associated with a given user is obtained from one or more sources. In one embodiment, one or more income identification parameters are defined. In one embodiment, the one or more income identification parameters include, but are not limited to, an amount range associated with a deposit transaction and a date of deposit range associated with a deposit transaction. In one embodiment, the given user then identifies one or more deposit transactions included in the financial transaction data as an income transaction, and/or indentifies a given payor/income source associated with one or more identified income transactions. In one embodiment, the user identified income transactions are then analyzed to determine the income identification parameter values associated with the user identified income transactions. In one embodiment, one or more unidentified deposit transactions associated with the user are then analyzed and/or categorized according to the one or more income identification parameter values associated with the each of the one or more unidentified deposit transactions. In one embodiment, the one or more income identification parameter values associated with each the one or more unidentified deposit transactions, and/or unidentified deposit transaction categories, are then compared with the income identification parameter values associated with the user identified income transactions. In one embodiment, any of one or more unidentified deposit transactions having income identification parameter values the same as, or sufficiently similar to, the income identification parameter values associated with the user identified income transactions are then categorized as identified income transactions of the same type, and/or as being from the same given payor/income source, as the user identified income transactions. In one embodiment, the identified income transactions are then analyzed to determine if the identified income transactions are of a recurring nature and, if so, the frequency of the recurring income. In one embodiment, the user is provided the opportunity to review and/or accept the identified income transactions as being correctly categorized.

Figure 2:
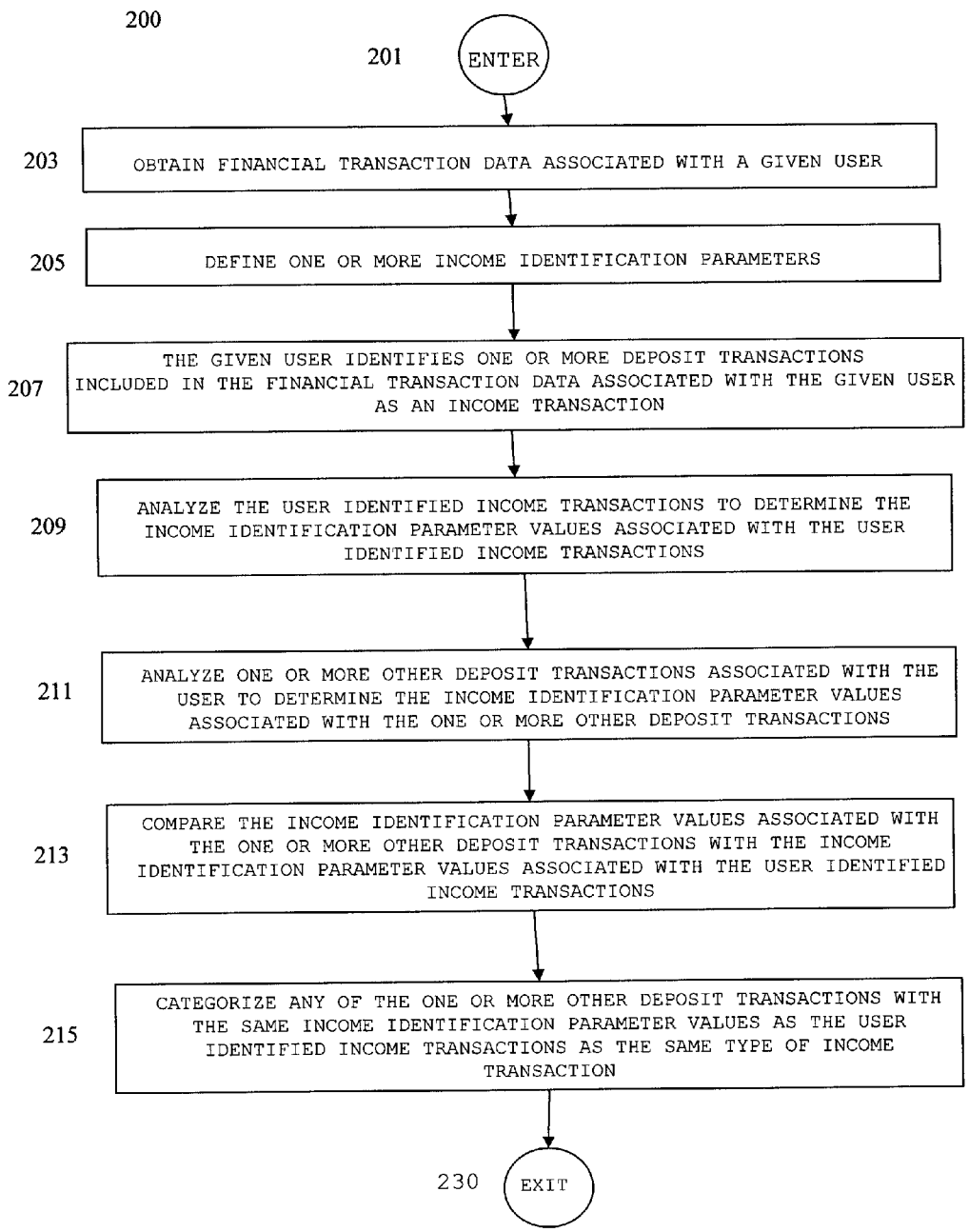
FIG. 2 is a flow chart depicting a process for detecting and categorizing recurring income in accordance with one embodiment.

FIG. 2 is a flow chart depicting a process for detecting and categorizing recurring income 200 in accordance with one embodiment. Process for detecting and categorizing recurring income 200 begins at ENTER OPERATION 201 of FIG. 2 and process flow proceeds to OBTAIN FINANCIAL TRANSACTION DATA ASSOCIATED WITH A GIVEN USER OPERATION 203.

In one embodiment, at OBTAIN FINANCIAL TRANSACTION DATA ASSOCIATED WITH A GIVEN USER OPERATION 203 financial transaction data associated with a given user is obtained from one or more sources.

In one embodiment, at OBTAIN FINANCIAL TRANSACTION DATA ASSOCIATED WITH A GIVEN USER OPERATION 203 the financial transaction data associated with the given user includes, but is not limited to, financial transaction data indicating one or more deposit transactions associated with the user; dates of specific deposit transactions; amounts associated with specific deposit transactions; and/or any other data regarding specific financial transactions desired and/or available.

In one embodiment, at OBTAIN FINANCIAL TRANSACTION DATA ASSOCIATED WITH A GIVEN USER OPERATION 203 access to the financial transaction data associated with the given user is obtained through a computing system implemented financial management system, such as computing system implemented financial management systems 180 and/or 190 of FIG. 1, that implements, includes, is accessible by, and/or is otherwise associated with, the process for detecting and categorizing recurring income.

Herein, a computing system implemented financial management system can be, but is not limited to, any data management system implemented on a computing system, and/or accessed through a network, that gathers financial data, including financial transactional data, from one or more sources and/or offers the capability to analyze and categorize at least part of the financial data. Herein, a computing system implemented financial management system can be, but is not limited to, any of the following: a computing system implemented personal financial management system; a computing system implemented business financial management system; an on-line banking system; a computing system implemented home and/or business inventory system; a computing system implemented personal and/or business asset management system; a computing system implemented personal and/or business accounting system; a computing system implemented personal and/or business tax preparation system; a computing system implemented healthcare management system; and/or any of the numerous computing system implemented data management systems discussed herein, and/or known to those of skill in the art at the time of filing, and/or as developed after the time of filing, that include the capability to analyze and categorize financial data from multiple sources.

Specific examples of computing system implemented financial management systems include, but are not limited to: Quicken™, available from Intuit Inc. of Mountain View, Calif.; Quicken On-Line™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other computing system implemented financial management systems discussed herein, and/or known to those of skill in the art at the time of filing, and/or as developed after the time of filing.

Current computing system implemented financial management systems are typically software and/or Web-based applications which, along with a parent computing system or device, and/or a network, help users manage their finances by providing a centralized interface with banks, credit card companies, asset account providers, mortgage companies, retirement account providers and other various financial and asset management institutions and/or accounts, for identifying, processing, storing, and categorizing user financial transactions. Currently, computing system implemented financial management systems typically obtain most, it not all, of the user's financial and/or transactional data as well as a significant amount of the user's demographic and personal data.

Currently, some computing system implemented financial management systems also typically obtain highly detailed financial transaction information from all, or most, sources used by the user, such as payee identification, payee location, payment amount, date of the transaction, time of transaction, products purchased, etc., via communication with banks, credit card providers, or other financial institutions, using data entry, links to databases, and electronic data transfer systems such as the Open Financial Exchange (OFX) specification, or various other systems for transferring financial transaction data.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, from a user, one or more banks, and/or any other financial institutions, and/or other financial data source via any network or network system, such as network 130 of FIG. 1, and/or as discussed herein, and/or available or known at the time of filing, and/or as later developed.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, through a user interface device, such as keyboards 107, 157, 147 of FIG. 1, mice 111, 161, 187 of FIG. 1, a touchpad, voice recognition software, or any other device and/or system capable of providing input to a computing system and/or for translating various actions into computing system operations, whether available or known at the time of filing or as developed later.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, from a database, such as database 170 of FIG. 1, maintained by a user, one or more banks, and/or any other financial institution, or any data source, as discussed herein, and/or available or known at the time of filing, and/or as later developed.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, by embedding the data in, or on, a computer program product, as defined herein.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, from one or more of the following, either directly, or by using screen scraping technology, or a similar technology: websites sponsored by, controlled by, or associated with banks, debit cards and/or accounts, credit unions, credit cards and/or accounts, and/or credit card/account providers, asset accounts and/or asset account providers, or other financial resources, accounts and/or services used by a user to receive deposits and/or to pay for and/or conduct user financial transactions; and/or computing system implemented applications sponsored by, controlled by, or associated with banks, debit cards and/or accounts, credit unions, credit cards and/or accounts, and/or credit card/account providers, asset accounts and/or asset account providers, or other financial resources, accounts and/or services used by a user to receive deposits and/or to pay for and/or conduct user financial transactions.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, by any method, apparatus, process or mechanism for transferring data from one or more devices, computing systems, server systems, databases, web site/web functions and/or any devices having a data storage capability to one or more other devices, computing systems, server systems, databases, web site/web functions and/or any devices having a data storage capability, whether known at the time of filing or as thereafter developed.

Returning to FIG. 2, in one embodiment, at OBTAIN FINANCIAL TRANSACTION DATA ASSOCIATED WITH A GIVEN USER OPERATION 203, the financial transaction data associated with the given user is provided to, and/or entered into, and/or transferred to, and/or downloaded to, and/or otherwise obtained by, process for detecting and categorizing recurring income 200, and/or a computing system implemented financial management system associated with process for detecting and categorizing recurring income 200, from any combination of the above sources and/or from any other source of financial transaction data associated with the given user whether known at the time of filing or as developed thereafter.

In one embodiment, once financial transaction data associated with a given user is obtained from one or more sources at OBTAIN FINANCIAL TRANSACTION DATA ASSOCIATED WITH A GIVEN USER OPERATION 203, process flow proceeds to DEFINE ONE OR MORE INCOME IDENTIFICATION PARAMETERS OPERATION 205.

In one embodiment, at DEFINE ONE OR MORE INCOME IDENTIFICATION PARAMETERS OPERATION 205 one or more income identification parameters are defined including, but not limited to, an amount range associated with a deposit transaction and a date of deposit range associated with a deposit transaction.

In one embodiment, at DEFINE ONE OR MORE INCOME IDENTIFICATION PARAMETERS OPERATION 205 the one or more income identification parameters include, but are not limited to, an exact amount, and/or an amount range, associated with a deposit transaction such as an exact dollar amount or a dollar amount in a range between a defined low dollar amount and a defined high dollar amount.

In one embodiment, at DEFINE ONE OR MORE INCOME IDENTIFICATION PARAMETERS OPERATION 205, the one or more income identification parameters include, but are not limited to, a date of deposit range associated with a deposit transaction such as a given day, or range of days, of each week, month, quarter, year, etc.

In one embodiment, at DEFINE ONE OR MORE INCOME IDENTIFICATION PARAMETERS OPERATION 205, the one or more income identification parameters include any income identification parameter desired and/or defined by process for detecting and categorizing recurring income 200 and/or the user of process for detecting and categorizing recurring income 200.

In one embodiment, at DEFINE ONE OR MORE INCOME IDENTIFICATION PARAMETERS OPERATION 205, the one or more income identification parameters are defined by process for detecting and categorizing recurring income 200. In one embodiment, at DEFINE ONE OR MORE INCOME IDENTIFICATION PARAMETERS OPERATION 205, the one or more income identification parameters are defined by process for detecting and categorizing recurring income 200 and the income identification parameters can be approved/edited by the user. In one embodiment, at DEFINE ONE OR MORE INCOME IDENTIFICATION PARAMETERS OPERATION 205, the one or more income identification parameters are defined by the user.

In one embodiment, at DEFINE ONE OR MORE INCOME IDENTIFICATION PARAMETERS OPERATION 205, the one or more income identification parameters are defined based on an analysis of the financial transaction data associated with the given user of OBTAIN FINANCIAL TRANSACTION DATA ASSOCIATED WITH A GIVEN USER OPERATION 203. In one embodiment, at DEFINE ONE OR MORE INCOME IDENTIFICATION PARAMETERS OPERATION 205, the one or more income identification parameters are defined by a computing system implemented financial management system, such as computing system implemented financial management systems 180 and/or 190 of FIG. 1, that is a parent system for, or is otherwise associated with, process for detecting and categorizing recurring income 200.

In one embodiment, once one or more income identification parameters are defined including, but not limited to, an amount range associated with a deposit transaction and a date of deposit range associated with a deposit transaction at DEFINE ONE OR MORE INCOME IDENTIFICATION PARAMETERS OPERATION 205, process flow proceeds to THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions.

In one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions, through a user interface display displayed on any display device, such as display devices 115, 165, 125, 189 of FIG. 1, and/or as discussed herein, and/or known in the art at the time of filing, and/or developed after the time of filing, that is accessible by the user. In one embodiment, the display device is associated with any computing system, such as computing systems 100, 140, 150, and server system 120, of FIG. 1, and/or as discussed herein, and/or known in the art at the time of filing, and/or as developed after the time of filing.

Returning to FIG. 2, in one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions, using a user interface device, such as keyboards 115, 165, or 147 of FIG. 1, mice 111, 161, or 187, a touchpad, voice recognition software, or any other device and/or system capable of providing input to a computing system and/or for translating various actions into computing system operations, whether available or known at the time of filing or as developed later.

Returning to FIG. 2, in one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions, via a user interview conducted by phone, by post, by e-mail, by text messaging, through a website, or by any other method of communicating with a user.

Returning to FIG. 2, in one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions, through a computing system implemented financial management system, such as computing system implemented financial management systems 180 and/or 190 of FIG. 1, that implements, includes, is accessible by, and/or is otherwise associated with the process for detecting and categorizing recurring income.

As noted above, herein, a computing system implemented financial management system can be, but is not limited to, any data management system implemented on a computing system, and/or accessed through a network, that gathers financial data, including financial transactional data, from one or more sources and/or offers the capability to analyze and categorize at least part of the financial data.

Specific examples of computing system implemented financial management systems include, but are not limited to: Quicken', available from Intuit Inc. of Mountain View, Calif.; Quicken On-Line™, available from Intuit Inc. of Mountain View, Calif.; Quickbooks™, available from Intuit Inc. of Mountain View, Calif.; Quicken Health Expense Manager™, available from Intuit Inc. of Mountain View, Calif.; Mint.com, available at http://www.mint.com; Microsoft Money™, available from Microsoft, Inc. of Redmond, Wash.; and/or various other computing system implemented financial management systems discussed herein, and/or known to those of skill in the art at the time of filing, and/or as developed after the time of filing.

Returning to FIG. 2, in one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies as few as one deposit transaction included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions.

In one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies two or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions.

In one embodiment, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 one or more deposit transactions included in the financial transaction data of OBTAIN FINANCIAL TRANSACTION DATA ASSOCIATED WITH A GIVEN USER OPERATION 203 that were previously identified by the user as an income transaction, and/or indentified as being associated with a given payor/income source are obtained and/or used.

In one embodiment, once the given user identifies one or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207, process flow proceeds to ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209.

In one embodiment, at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed using the income identification parameters of DEFINE ONE OR MORE INCOME IDENTIFICATION PARAMETERS OPERATION 205 to determine the income identification parameter values associated with the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed using the income identification parameters of DEFINE ONE OR MORE INCOME IDENTIFICATION PARAMETERS OPERATION 205 to determine the deposit amount, and/or deposit amount range, associated with the user identified income transactions.

In one embodiment, at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed using the income identification parameters of DEFINE ONE OR MORE INCOME IDENTIFICATION PARAMETERS OPERATION 205 to determine the deposit date, and/or deposit date range, associated with the user identified income transactions.

As noted above, in some embodiments, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies as few as one deposit transaction included in the financial transaction data of OBTAIN FINANCIAL TRANSACTION DATA ASSOCIATED WITH A GIVEN USER OPERATION 203 as an income transaction, and/or indentifies a given payor/income source associated with one identified income transaction.

In these instances, at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the single user identified income transaction of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed to determine a single value for each of the income identification parameters of DEFINE ONE OR MORE INCOME IDENTIFICATION PARAMETERS OPERATION 205. However, in some embodiments a value range may still be applied centering on the one known value.

As also noted above, in some embodiments, at THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 the given user identifies two or more deposit transactions included in the financial transaction data of OBTAIN FINANCIAL TRANSACTION DATA ASSOCIATED WITH A GIVEN USER OPERATION 203 as an income transaction, and/or indentifies a given payor/income source associated with one or more identified income transactions.

In these instances, at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the two or more user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 are analyzed to determine the values for each of the income identification parameters of DEFINE ONE OR MORE INCOME IDENTIFICATION PARAMETERS OPERATION 205. If the values for a given income identification parameter for the two or more user identified income transactions are different, then the values for the given income identification parameter for the two or more user identified income transactions are used to define a value range for the given income identification parameter. However, in some embodiments a different value range may still be applied centering on the known values.

For example, if at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209 data representing the three user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 indicates the same identified payor but the amounts of $10.00, $15.00 and $20.00, deposited on the $12^{th}$, $13^{th}$ and $16^{th}$ of the month, then the value range of the income identification parameter of amount of deposit would be defined as between $10.00 and $20.00 and the value range of the income identification parameter of date of deposit would be defined as between the $12^{th}$ and the $16^{th}$ of the month.

In one embodiment, the data representing the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed using the income identification parameters of DEFINE ONE OR MORE INCOME IDENTIFICATION PARAMETERS OPERATION 205 to determine the income identification parameter values associated with the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209, using a processor, such as CPU 101, CPU 151, CPU 141 and processor 121, of FIG. 1 associated with any computing system, such as computing systems 100, 140, and 150, or server system 120 of FIG. 1.

In one embodiment, once data representing the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 is analyzed using the income identification parameters of DEFINE ONE OR MORE INCOME IDENTIFICATION PARAMETERS OPERATION 205 to determine the income identification parameter values associated with the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 at ANALYZE THE USER IDENTIFIED INCOME TRANSACTIONS TO DETERMINE THE INCOME IDENTIFICATION PARAMETER VALUES ASSOCIATED WITH THE USER IDENTIFIED INCOME TRANSACTIONS OPERATION 209, process flow proceeds to ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211.

In one embodiment, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 one or more unidentified deposit transactions in the financial data associated with the user of OBTAIN FINANCIAL TRANSACTION DATA ASSOCIATED WITH A GIVEN USER OPERATION 203 are then analyzed and/or categorized according to their associated values for the one or more income identification parameters of DEFINE ONE OR MORE INCOME IDENTIFICATION PARAMETERS OPERATION 205.

In one embodiment, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 the one or more unidentified deposit transactions associated with the user, other than the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207, are obtained and analyzed, and/or categorized, according to the one or more income identification parameter values associated with each of the one or more unidentified deposit transactions.

In one embodiment, one or more of the one or more unidentified deposit transactions associated with the user of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, other than the user identified income transactions, are historical unidentified deposit transactions pre-dating the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, one or more of the one or more unidentified deposit transactions associated with the user of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, other than the user identified income transactions, are future unidentified deposit transactions taking place after the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and are categorized according to a single value for each of the income identification parameters of DEFINE ONE OR MORE INCOME IDENTIFICATION PARAMETERS OPERATION 205. However, in some embodiments a value range may be applied centering on the single value.

For instance, as one example, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and categorized according to a single deposit amount or a defined deposit amount range.

As another example, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and categorized according to a single deposit date or a defined deposit date range.

In some embodiments, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and categorized according to the associated values of one of the one or more income identification parameters of DEFINE ONE OR MORE INCOME IDENTIFICATION PARAMETERS OPERATION 205.

In some embodiments, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and categorized according to the associated values of two or more of the one or more income identification parameters of DEFINE ONE OR MORE INCOME IDENTIFICATION PARAMETERS OPERATION 205.

In some embodiments, at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, the one or more unidentified deposit transactions in the financial data associated with the user of OBTAIN FINANCIAL TRANSACTION DATA ASSOCIATED WITH A GIVEN USER OPERATION 203 are analyzed and categorized according to the associated values of all of the one or more income identification parameters of DEFINE ONE OR MORE INCOME IDENTIFICATION PARAMETERS OPERATION 205.

In one embodiment, the one or more unidentified deposit transactions in the financial data associated with the user of OBTAIN FINANCIAL TRANSACTION DATA ASSOCIATED WITH A GIVEN USER OPERATION 203 are analyzed and/or categorized according to their associated values for the one or more income identification parameters of DEFINE ONE OR MORE INCOME IDENTIFICATION PARAMETERS OPERATION 205 at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 using a processor, such as CPU 101, CPU 151, CPU 141 and processor 121, of FIG. 1 associated with any computing system, such as computing systems 100, 140, and 150, or server system 120 of FIG. 1.

In one embodiment, once one or more unidentified deposit transactions in the financial data associated with the user of OBTAIN FINANCIAL TRANSACTION DATA ASSOCIATED WITH A GIVEN USER OPERATION 203 are analyzed and/or categorized according to their associated values for the one or more income identification parameters of DEFINE ONE OR MORE INCOME IDENTIFICATION PARAMETERS OPERATION 205 at ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211, process flow proceeds to COMPARE THE INCOME IDENTIFICATION PARAMETER VALUES ASSOCIATED WITH THE ONE OR MORE OTHER DEPOSIT TRANSACTIONS WITH THE INCOME IDENTIFICATION PARAMETER VALUES ASSOCIATED WITH THE USER IDENTIFIED INCOME TRANSACTIONS OPERATION 213.

In one embodiment, at COMPARE THE INCOME IDENTIFICATION PARAMETER VALUES ASSOCIATED WITH THE ONE OR MORE OTHER DEPOSIT TRANSACTIONS WITH THE INCOME IDENTIFICATION PARAMETER VALUES ASSOCIATED WITH THE USER IDENTIFIED INCOME TRANSACTIONS OPERATION 213 the one or more income identification parameter values associated with each the one or more unidentified deposit transactions, and/or unidentified deposit transaction categories, of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 are compared with the income identification parameter values associated with the user identified income transactions of CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 213 to try and identify one or more of the unidentified deposit transactions as being an income transaction of the same type as the user identified income transactions.

In one embodiment, at COMPARE THE INCOME IDENTIFICATION PARAMETER VALUES ASSOCIATED WITH THE ONE OR MORE OTHER DEPOSIT TRANSACTIONS WITH THE INCOME IDENTIFICATION PARAMETER VALUES ASSOCIATED WITH THE USER IDENTIFIED INCOME TRANSACTIONS OPERATION 213 the one or more income identification parameter values associated with each the one or more unidentified deposit transactions, and/or unidentified deposit transaction categories, are compared with the income identification parameter values associated with the user identified income transactions to determine if the one or more income identification parameter values associated with each the one or more unidentified deposit transactions, and/or unidentified deposit transaction categories, are the same as, or fall within the range of, the income identification parameter values associated with the user identified income transactions.

In one embodiment, at COMPARE THE INCOME IDENTIFICATION PARAMETER VALUES ASSOCIATED WITH THE ONE OR MORE OTHER DEPOSIT TRANSACTIONS WITH THE INCOME IDENTIFICATION PARAMETER VALUES ASSOCIATED WITH THE USER IDENTIFIED INCOME TRANSACTIONS OPERATION 213 the one or more income identification parameter values associated with each the one or more unidentified deposit transactions, and/or unidentified deposit transaction categories, are compared with the income identification parameter values associated with the user identified income transactions to determine if the one or more income identification parameter values associated with each the one or more unidentified deposit transactions, and/or unidentified deposit transaction categories, are the same as, or fall within the range of, the income identification parameter values associated with the user identified income transactions using a processor, such as CPU 101, CPU 151, CPU 141 and processor 121, of FIG. 1 associated with any computing system, such as computing systems 100, 140, and 150, or server system 120 of FIG. 1.

In one embodiment, once the one or more income identification parameter values associated with each the one or more unidentified deposit transactions, and/or unidentified deposit transaction categories, of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 are compared with the income identification parameter values associated with the user identified income transactions of CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 213 to try and identify one or more of the unidentified deposit transactions as being an income transaction of the same type as the user identified income transactions at COMPARE THE INCOME IDENTIFICATION PARAMETER VALUES ASSOCIATED WITH THE ONE OR MORE OTHER DEPOSIT TRANSACTIONS WITH THE INCOME IDENTIFICA- TION PARAMETER VALUES ASSOCIATED WITH THE USER IDENTIFIED INCOME TRANSACTIONS OPERATION 213, process flow proceeds to CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 any of one or more unidentified deposit transactions of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 having income identification parameter values the same as, or sufficiently similar to, the income identification parameter values associated with the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 are categorized by process for detecting and categorizing recurring income 200 as identified income transactions of the same type, and/or as being from the same given payor/income source, as the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 any of one or more unidentified deposit transactions having income identification parameter values the same as, or within the range of, the income identification parameter values associated with the user identified income transactions are categorized by process for detecting and categorizing recurring income 200 as identified potential income transactions of the same type, and/or as being from the same given payor/income source, as the user identified income transactions.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 all the identified income transactions, including the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 and the deposit transactions indentified as income transactions by process for detecting and categorizing recurring income 200 at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215, are further analyzed to determine if the identified income transactions are of a recurring nature. In one embodiment, this analysis is performed using a one or more methods such as matrix evaluation and/or iterative analysis executed on a processor, such as CPU 101, CPU 151, CPU 141 and processor 121, of FIG. 1 associated with any computing system, such as computing systems 100, 140, and 150, or server system 120 of FIG. 1.

Returning to FIG. 2, in one embodiment, the identified income transactions identified as being of a recurring nature are further analyzed to determine a frequency of payment of the identified income and/or to further refine the income identification parameter values, and/or value ranges, associated with the identified income transactions. In one embodiment, this analysis is performed using a processor, such as CPU 101, CPU 151, CPU 141 and processor 121, of FIG. 1 associated with any computing system, such as computing systems 100, 140, and 150, or server system 120 of FIG. 1.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 deposit transactions indentified as income transactions by process for detecting and categorizing recurring income 200 are automatically categorized as being of the same type, and/or as being from the same given payor/income source, as the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 deposit transactions indentified as income transactions by process for detecting and categorizing recurring income 200 are automatically temporarily categorized as being of the same type, and/or as being from the same given payor/income source, as the user identified income transactions THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207, and the user is then provided the capability of changing the status of the process indentified income transactions.

In one embodiment, at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215 deposit transactions indentified as income transactions by process for detecting and categorizing recurring income 200 are provided to the user for user approval before being categorized as being of the same type, and/or as being from the same given payor/income source, as the user identified income transactions THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207.

In one embodiment, once any of one or more unidentified deposit transactions of ANALYZE ONE OR MORE OTHER DEPOSIT TRANSACTIONS ASSOCIATED WITH THE USER TO DETERMINE THE INCOME IDENTIFICATION PARAMETER VALUES ASSOCIATED WITH THE ONE OR MORE OTHER DEPOSIT TRANSACTIONS OPERATION 211 having income identification parameter values the same as, or sufficiently similar to, the income identification parameter values associated with the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 are categorized as identified income transactions of the same type, and/or as being from the same given payor/income source, as the user identified income transactions of THE GIVEN USER IDENTIFIES ONE OR MORE DEPOSIT TRANSACTIONS INCLUDED IN THE FINANCIAL TRANSACTION DATA ASSOCIATED WITH THE GIVEN USER AS AN INCOME TRANSACTION OPERATION 207 at CATEGORIZE ANY OF THE ONE OR MORE OTHER DEPOSIT TRANSACTIONS WITH THE SAME INCOME IDENTIFICATION PARAMETER VALUES AS THE USER IDENTIFIED INCOME TRANSACTIONS AS THE SAME TYPE OF INCOME TRANSACTION OPERATION 215, process flow proceeds to EXIT OPERATION 230. In one embodiment, at EXIT OPERATION 230, process for detecting and categorizing recurring income 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for detecting and categorizing recurring income 200, the user manually identifies a given deposit transaction as an income transaction, and/or manually identifies the source, or payor, of an income transaction, a minimal number of times; in one embodiment, only once. Then, using process for detecting and categorizing recurring income 200, each time the income transaction appears in the user's financial data as an unidentified deposit transaction, it is automatically, or semi-automatically, identified as an income transaction of the same type, and/or from the same source. Consequently, using process for detecting and categorizing recurring income 200, not only is the user spared the burden of repeatedly identifying the recurring income transaction, and labeling it via manual data input, but a computing system implemented financial management system implementing process for detecting and categorizing recurring income 200, can readily identify the recurring income source and use this information to more efficiently, effectively, and realistically perform financial analysis and provide financial projections.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "obtaining", "identifying", "analyzing", "presenting", "defining", "saving", "displaying", "categorizing", "providing", "processing", "obtaining", "comparing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for detecting and categorizing recurring income comprising:
    executing operations via any set of one or more processors, the operations comprising:
    obtaining financial transaction data associated with a party, the financial transaction data associated with the party including three or more deposit transactions;
    defining one or more income identification parameters, the one or more income identification parameters being defined such that an identified income transaction has at least one income identification parameter value associated with the identified income transaction;
    identifying two or more of the three or more deposit transactions included with the financial transaction data associated with the party as identified income transactions from a given payor;
    analyzing data associated with the two or more identified income transactions to determine an income identification parameter value range associated with at least one of the one or more income identification parameters using the two or more identified income transactions, wherein the income identification parameter value range associated with the two or more identified income transactions has a lower limit value obtained from a first identified income transaction and an upper limit value obtained from a second identified income transaction;
    analyzing one or more deposit transactions other than the two or more identified income transactions to determine respective income identification parameter values associated with each of the analyzed one or more deposit transactions other than the two or more identified income transactions;
    comparing the income identification parameter value range associated with the two or more identified income transactions with the respective income identification parameter values associated with each of the analyzed deposit transactions other than the two or more identified income transactions;
    determining that one or more of the analyzed deposit transactions other than the two or more identified income transactions includes at least one income identification parameter value that is within the income identification parameter value range associated with the two or more identified income transactions; and
    categorizing the identified one or more of the analyzed deposit transactions other than the two or more identified income transactions that includes at least one income identification parameter value that is within the income identification parameter value range associated with the two or more identified income transactions as process identified income transactions from the given payor associated with the two or more identified income transactions.

2. The computing system implemented process for detecting and categorizing recurring income of claim 1, wherein;
    at least part of the financial transaction data associated with the party is obtained by a computing system implemented financial management system.

3. The computing system implemented process for detecting and categorizing recurring income of claim 1, wherein;
    at least part of the financial transaction data associated with the party is obtained by a computing system implemented personal financial management system.

4. The computing system implemented process for detecting and categorizing recurring income of claim 1, wherein;
    at least part of the financial transaction data associated with the party is obtained by an on-line banking system.

5. The computing system implemented process for detecting and categorizing recurring income of claim 1, wherein;
    at least part of the financial transaction data associated with the party is obtained from an on-line banking system.

6. The computing system implemented process for detecting and categorizing recurring income of claim 1, wherein;
    at least part of the financial transaction data associated with the party is obtained from at least one financial data source selected from the group of financial data sources consisting of:
    a bank;
    a debit card account;
    a credit union; or
    a credit card account.

7. The computing system implemented process for detecting and categorizing recurring income of claim 1, wherein;
    at least part of the financial transaction data associated with the party is obtained from two or more financial data sources selected from the group of financial data sources consisting of:
    a bank;
    a debit card account;
    a credit union; or
    a credit card account.

8. The computing system implemented process for detecting and categorizing recurring income of claim 1, wherein;
    the one or more income identification parameters include an amount associated with a deposit transaction.

9. The computing system implemented process for detecting and categorizing recurring income of claim 1, wherein;
    the one or more income identification parameters include a date of deposit associated with a deposit transaction.

10. The computing system implemented process for detecting and categorizing recurring income of claim 1, wherein;
the one or more income identification parameters include an amount associated with a deposit transaction and a date of deposit associated with a deposit transaction.

11. The computing system implemented process for detecting and categorizing recurring income of claim 1, wherein;
a second income identification parameter value range associated with the one or more identified income transactions has a defined lower limit value and a defined upper limit value.

12. A computer program product for detecting and categorizing recurring income comprising:
a nontransitory computer readable medium;
and computer program code, encoded on the computer readable medium, comprising computer readable instructions which when executed on a set of one or more processors perform a process for:
obtaining financial transaction data associated with a party, the financial transaction data associated with the party including three or more deposit transactions;
defining one or more income identification parameters, the one or more income identification parameters being defined such that an identified income transaction has at least one income identification parameter value associated with the identified income transaction;
identifying two or more of the three or more deposit transactions included with the financial transaction data associated with the party as identified income transactions from a given payor;
analyzing data associated with the two or more identified income transactions to determine an income identification parameter value range associated with at least one of the one or more income identification parameters using the two or more identified income transactions, wherein the income identification parameter value range associated with the two or more identified income transactions has a lower limit value obtained from a first identified income transaction and an upper limit value obtained from a second identified income transaction;
analyzing one or more deposit transactions other than the two or more identified income transactions to determine respective income identification parameter values associated with each of the analyzed one or more deposit transactions other than the two or more identified income transactions using a processor associated with a computing system;
comparing the income identification parameter value range associated with the two or more identified income transactions with the respective income identification parameter values associated with each of the analyzed deposit transactions other than the two or more identified income transactions;
determining that one or more of the analyzed deposit transactions other than the two or more identified income transactions includes at least one income identification parameter value that is within the income identification parameter value range associated with the two or more identified income transactions; and
categorizing the identified one or more of the analyzed deposit transactions other than the two or more identified income transactions that includes at least one income identification parameter value that is within the income identification parameter value range associated with the two or more identified income transactions as process identified income transactions from the given payor associated with the two or more identified income transactions.

13. The computer program product for detecting and categorizing recurring income of claim 12, wherein;
at least part of the financial transaction data associated with the party is obtained by a computing system implemented financial management system.

14. The computer program product for detecting and categorizing recurring income of claim 12, wherein;
at least part of the financial transaction data associated with the party is obtained by a computing system implemented personal financial management system.

15. The computer program product for detecting and categorizing recurring income of claim 12, wherein;
at least part of the financial transaction data associated with the party is obtained by an on-line banking system.

16. The computer program product for detecting and categorizing recurring income of claim 12, wherein;
at least part of the financial transaction data associated with the party is obtained by from an on-line banking system.

17. The computer program product for detecting and categorizing recurring income of claim 12, wherein;
at least part of the financial transaction data associated with the party is obtained from at least one financial data source selected from the group of financial data sources consisting of:
a bank;
a debit card account;
a credit union; or
a credit card account.

18. The computer program product for detecting and categorizing recurring income of claim 12, wherein;
at least part of the financial transaction data associated with the party is obtained from two or more financial data sources selected from the group of financial data sources consisting of or any combination thereof:
a bank;
a debit card account;
a credit union; or
a credit card account.

19. The computer program product for detecting and categorizing recurring income of claim 12, wherein;
the one or more income identification parameters include an amount associated with a deposit transaction.

20. The computer program product for detecting and categorizing recurring income of claim 12, wherein;
the one or more income identification parameters include a date of deposit associated with a deposit transaction.

21. The computer program product for detecting and categorizing recurring income of claim 12, wherein;
the one or more income identification parameters include an amount associated with a deposit transaction and a date of deposit associated with a deposit transaction.

22. A system for detecting and categorizing recurring income comprising:
at least one processor; and
at least one memory coupled to the at least one processor, the at least one memory having stored therein instructions which when executed by the at least one processor perform a process for detecting and categorizing recurring income, the process for detecting and categorizing recurring income comprising:
obtaining financial transaction data associated with a party, the financial transaction data associated with the party including three or more deposit transactions;

defining one or more income identification parameters, the one or more income identification parameters being defined such that an identified income transaction has at least one income identification parameter value associated with the identified income transaction;

identifying two or more of the three or more deposit transactions included with the financial transaction data associated with the party as identified income transactions from a given payor;

analyzing data associated with the two or more identified income transactions to determine an income identification parameter value range associated with at least one of the one or more income identification parameters using the two or more identified income transactions, wherein the income identification parameter value range associated with the two or more identified income transactions has a lower limit value obtained from a first identified income transaction and an upper limit value obtained from a second identified income transaction;

analyzing one or more deposit transactions other than the two or more identified income transactions to determine respective income identification parameter values associated with each of the analyzed one or more deposit transactions other than the two or more identified income transactions;

comparing the income identification parameter value range associated with the two or more identified income transactions with the respective income identification parameter values associated with each of the analyzed deposit transactions other than the two or more identified income transactions;

determining that one or more of the analyzed deposit transactions other than the two or more identified income transactions includes at least one income identification parameter value that is within the income identification parameter value range associated with the two or more identified income transactions; and categorizing the identified one or more of the analyzed deposit transactions other than the two or more identified income transactions that includes at least one income identification parameter value that is within the income identification parameter value range associated with the two or more identified income transactions as process identified income transactions from the given payor associated with the two or more identified income transactions.

23. The system for detecting and categorizing recurring income of claim 22, wherein;
at least part of the financial transaction data associated with the party is obtained by a computing system implemented financial management system.

24. The system for detecting and categorizing recurring income of claim 22, wherein;
at least part of the financial transaction data associated with the party is obtained by a computing system implemented personal financial management system.

25. The system for detecting and categorizing recurring income of claim 22, wherein;
at least part of the financial transaction data associated with the party is obtained by an on-line banking system.

26. The system for detecting and categorizing recurring income of claim 22, wherein;
at least part of the financial transaction data associated with the party is obtained by from an on-line banking system.

27. The system for detecting and categorizing recurring income of claim 22, wherein;
at least part of the financial transaction data associated with the party is obtained from at least one financial data source selected from the group of financial data sources consisting of:
a bank;
a debit card account;
a credit union; or
a credit card account.

28. The system for detecting and categorizing recurring income of claim 22, wherein;
at least part of the financial transaction data associated with the party is obtained from two or more financial data sources selected from the group of financial data sources consisting of:
a bank;
a debit card account;
a credit union; or
a credit card account.

29. The system for detecting and categorizing recurring income of claim 22, wherein;
the one or more income identification parameters include an amount associated with a deposit transaction.

30. The system for detecting and categorizing recurring income of claim 22, wherein;
the one or more income identification parameters include a date of deposit associated with a deposit transaction.

31. The system for detecting and categorizing recurring income of claim 22, wherein;
the one or more income identification parameters include an amount associated with a deposit transaction and a date of deposit associated with a deposit transaction.

* * * * *